US010303733B2

(12) United States Patent
Soora et al.

(10) Patent No.: US 10,303,733 B2
(45) Date of Patent: May 28, 2019

(54) PERFORMING CONTEXT-AWARE SPATIAL, TEMPORAL, AND ATTRIBUTE SEARCHES FOR PROVIDERS OR RESOURCES (71) Applicant: International Business Machines Corporation, Armonk, NY (US)

(72) Inventors: Gopal Soora, Cary, NC (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 15/277,399

(22) Filed: Sep. 27, 2016

(65) Prior Publication Data
US 2018/0089205 A1    Mar. 29, 2018

(51) Int. Cl.
G06F 17/30 (2006.01)
G06F 16/9537 (2019.01)
(Continued)

(52) U.S. Cl.
CPC .... *G06F 16/9537* (2019.01); *G06F 16/24575* (2019.01); *G06F 16/9535* (2019.01)

(58) Field of Classification Search
USPC ........ 707/607, 609, 687, 705, 790, 813, 821
See application file for complete search history.

(56) References Cited

U.S. PATENT DOCUMENTS 5,948,040 A * 9/1999 DeLorme ............... G01C 21/36
340/990
8,676,667 B1 * 3/2014 Paiz ...................... G06F 16/951
705/26.63

(Continued)

FOREIGN PATENT DOCUMENTS

WO    WO2006014824 A1    2/2006
WO    WO2010151001 A3    12/2010
WO    WO2013063328 A1    5/2013

OTHER PUBLICATIONS

Sashima, A., "Spatio-Temporal Sensor Data Management for Context-Aware Services: Designating Sensor-Event Driven Service Coordination Middleware" In Proceedings of the 1st International Workshop on Advanced data processing in ubiquious computing; ADPUC 2006, pp. 1-6.

(Continued)

*Primary Examiner* — Sana A Al-Hashemi
(74) *Attorney, Agent, or Firm* — Scully, Scott, Murphy & Presser, P.C.; Rahan Uddin, Esq.

(57) ABSTRACT

Performing a search to locate a set of candidate providers within a current context. An inventory associates each of a respective plurality of providers with a corresponding context of a plurality of contexts, a corresponding temporally defined dynamic state, and a corresponding set of static attributes. The inventory is searched to identify providers that are associated with the current context. The corresponding temporally defined dynamic state and the corresponding set of static attributes that are associated with each of the identified providers is retrieved. A query comprising a target temporally defined dynamic state and a target static attribute is received. A filtered set of providers is identified which satisfies the target static attribute. Each of the corresponding temporally defined dynamic states are compared with the target temporally defined state to determine a corresponding matching closeness level for each provider of the filtered set.

18 Claims, 3 Drawing Sheets

(51) Int. Cl.
*G06F 16/9535* (2019.01)
*G06F 16/2457* (2019.01)

(56) References Cited

U.S. PATENT DOCUMENTS

| | | |
|---|---|---|
| 2003/0135582 A1 | 7/2003 | Allen et al. |
| 2006/0212304 A1* | 9/2006 | Krause ................ B07C 3/00 705/307 |
| 2007/0198505 A1 | 8/2007 | Fuller |
| 2008/0005068 A1 | 1/2008 | Dumais et al. |
| 2009/0276317 A1* | 11/2009 | Dixon ................ G06Q 10/087 705/14.61 |
| 2014/0330770 A1 | 11/2014 | Yerli |
| 2015/0278355 A1 | 10/2015 | Hassanpour et al. |

OTHER PUBLICATIONS

Carlson, D., "Ambient Ocean: A Web Search Engine for Context-aware Smart Resource Discovery", 2014 IEEE International Conference on, and Green Computing and Communications, IEEE and Cyber, Physical and Social Computing; 2014; pp. 177-184.

* cited by examiner

FIG. 2

PERFORMING CONTEXT-AWARE SPATIAL, TEMPORAL, AND ATTRIBUTE SEARCHES FOR PROVIDERS OR RESOURCES

FIELD

The present application relates generally to computer-implemented searching procedures and, more specifically, to search engines that utilize context-aware spatial, temporal, and attribute searches to locate providers or resources.

BACKGROUND

"Contextere" is a Latin verb meaning "to weave together." When people speak to one another in person, the communication exchange is rich in implicit messages such as body language and eye contact. Moreover, the physical environment has innate characteristics that implicitly guide the thoughts and conversations that occur within that particular architectural space. The act of seeking information often starts with an internal conversation regarding context. By looking carefully at an information seeker's context, one may gain valuable cues to help filter information.

The Internet provides individuals with access to vast amounts of data. The sheer volume of this data poses challenges in terms of understanding patterns in the data, as well as connecting the available information with one's environment. In many cases, users are not seeking obscure data, but instead seek to utilize the Internet to provide data that could be used in one's immediate context to help make everyday decisions. From a practical standpoint, it is very difficult or impossible to perform a computer-based search to find a suitable set of providers or resources that can satisfy a set of spatial, temporal, and attribute-based constraints. For example, a person who is experiencing a bad earache may desire to locate a nearby doctor who accepts their insurance policy, who is able to give an appointment within 24 hours, and who specializes in problems involving the ear, nose, and throat. A person with a broken-down car may need to locate a mechanic who is affiliated with AAA, who will honor an extended warranty car, who has a repair shop in the local area, and who receives consistently good reviews from customers. A traveler on vacation in a distant city may be interested in locating the nearest store which will remain open for the next hour, and which is equipped to ship express mail packages. A traveler who has a sick child may wish to find the nearest pediatrician who can see the child as quickly as possible.

In each of the foregoing examples, existing computer-based search engines are ill-equipped for locating suitable service providers. More specifically, it is not a straightforward matter to use conventional attribute-matching techniques to perform a complex search involving information from many different sources. Direct attribute matching to find a suitable provider or resource is not always possible. For example, a first pediatrician that is located closest to the sick child may have an opening for an appointment later in the day, but a second pediatrician that is located further away may be able to see the sick child immediately. Thus, there exists a need to overcome at least one of the preceding deficiencies and limitations of the related art.

SUMMARY

The following summary is merely intended to be exemplary. The summary is not intended to limit the scope of the claims.

A computer-executed method performs a search to locate a set of candidate providers within a current context of a user or a device, in one aspect, by generating an inventory of providers associating each of a respective plurality of providers with a corresponding context of a plurality of contexts, a corresponding temporally defined dynamic state, and a corresponding set of static attributes; the plurality of contexts including at least the current context; searching the inventory of providers to identify one or more providers of the respective plurality of providers that are associated with the current context; querying the inventory of providers to retrieve the corresponding temporally defined dynamic state and the corresponding set of static attributes that are associated with each of the one or more identified providers; receiving a query from the user including a target temporally defined dynamic state and at least one target static attribute; for each of the one or more identified providers, comparing the corresponding set of static attributes with the at least one target static attribute to identify a filtered set of providers which satisfy the at least one target static attribute; comparing the corresponding temporally defined dynamic state with the target temporally defined state for each of a plurality of respective providers of the filtered set to determine a corresponding matching closeness level for each of the plurality of respective providers of the filtered set; and generating the set of candidate providers by prioritizing each of the plurality of respective providers of the filtered set based upon the corresponding matching closeness level for each of the plurality of respective providers of the filtered set.

The computer-executed method, in a further aspect, performs the prioritization by determining, for each of the plurality of respective providers in the filtered set, a corresponding first delay and a corresponding second delay. The corresponding first delay comprises a delay in availability of a respective provider of the filtered set, and the corresponding second delay comprises a delay in a user reaching a respective provider of the filtered set. The corresponding first delay and the corresponding second delay for each of the plurality of respective providers of the filtered set is summed to generate a corresponding provider delay for each of the plurality of respective providers of the filtered set. A prioritized provider of the filtered set is identified as having a lowest amount of provider delay among the plurality of respective providers of the filtered set. Alternatively or additionally, each of the plurality of respective providers of the filtered set is ranked to provide the set of candidate providers for the user, based upon the corresponding provider delay for each of the plurality of respective providers of the filtered list.

A computer program product for performing a search to locate a set of candidate providers within a current context of a user or a device, in another aspect, comprises a non-transitory computer-readable storage medium having a computer-readable program stored therein, wherein the computer-readable program, when executed on a computer system comprising at least one processor, causes the computer system to generate an inventory of providers associating each of a respective plurality of providers with a corresponding context of a plurality of contexts, a corresponding temporally defined dynamic state, and a corresponding set of static attributes; the plurality of contexts including at least the current context; search the inventory of providers to identify one or more providers of the respective plurality of providers that are associated with the current context; query the inventory of providers to retrieve the corresponding temporally defined dynamic state and the corresponding set of static attributes that are associated with each of the one or more identified providers; receive a query comprising a target temporally defined dynamic state and at least one target static attribute from the user; for each of the one or more identified providers, compare the corresponding set of static attributes with the at least one target static attribute to identify a filtered set of providers which satisfy the at least one target static attribute; compare the corresponding temporally defined dynamic state with the target temporally defined state for each of a plurality of respective providers of the filtered set to determine a corresponding matching closeness level for each of the plurality of respective providers of the filtered set; and generate the set of candidate providers by prioritizing each of the plurality of respective providers of the filtered set based upon the corresponding matching closeness level for each of the plurality of respective providers of the filtered set.

The computer program product, in a further aspect, is configured to prioritize by determining, for each of the plurality of respective providers of the filtered set, a corresponding first delay and a corresponding second delay. The corresponding first delay comprises a delay in availability of a respective provider of the filtered set, and the corresponding second delay comprises a delay in a user reaching a respective provider of the filtered set. The corresponding first delay and the corresponding second delay for each of the plurality of respective providers of the filtered set is summed to generate a corresponding provider delay for each of the plurality of respective providers of the filtered set. A prioritized provider of the filtered set is identified as having a lowest amount of provider delay among the plurality of respective providers of the filtered set. Alternatively or additionally, each of the plurality of respective providers of the filtered set is ranked to provide the set of candidate providers for the user, based upon the corresponding provider delay for each of the plurality of respective providers of the filtered list.

An apparatus for performing a search to locate a set of candidate providers within a current context of a user or a device, in another aspect, may comprise a processor and a non-transitory computer-readable memory coupled to the processor, wherein the memory comprises instructions which, when executed by the processor, cause the processor to generate an inventory of providers associating each of a respective plurality of providers with a corresponding context of a plurality of contexts, a corresponding temporally defined dynamic state, and a corresponding set of static attributes; the plurality of contexts including at least the current context; search the inventory of providers to identify one or more providers of the respective plurality of providers that are associated with the current context; query the inventory of providers to retrieve the corresponding temporally defined dynamic state and the corresponding set of static attributes that are associated with each of the one or more identified providers; receive a query comprising a target temporally defined dynamic state and at least one target static attribute from the user; for each of the one or more identified providers, compare the corresponding set of static attributes with the at least one target static attribute to identify a filtered set of providers which satisfy the at least one target static attribute; compare the corresponding temporally defined dynamic state with the target temporally defined state for each of a plurality of respective providers of the filtered set to determine a corresponding matching closeness level for each of the plurality of respective providers of the filtered set; and generate the set of candidate providers by prioritizing each of the plurality of respective providers of the filtered set based upon the corresponding matching closeness level for each of the plurality of respective providers of the filtered set.

The apparatus, in a further aspect, is configured to prioritize by determining, for each of the plurality of respective providers of the filtered set, a corresponding first delay and a corresponding second delay. The corresponding first delay comprises a delay in availability of a respective provider of the filtered set, and the corresponding second delay comprises a delay in a user reaching a respective provider of the filtered set. The corresponding first delay and the corresponding second delay for each of the plurality of respective providers of the filtered set is summed to generate a corresponding provider delay for each of the plurality of respective providers of the filtered set. A prioritized provider of the filtered set is identified as having a lowest amount of provider delay among the plurality of respective providers of the filtered set. Alternatively or additionally, each of the plurality of respective providers of the filtered set is ranked to provide the set of candidate providers for the user, based upon the corresponding provider delay for each of the plurality of respective providers of the filtered list.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1A:
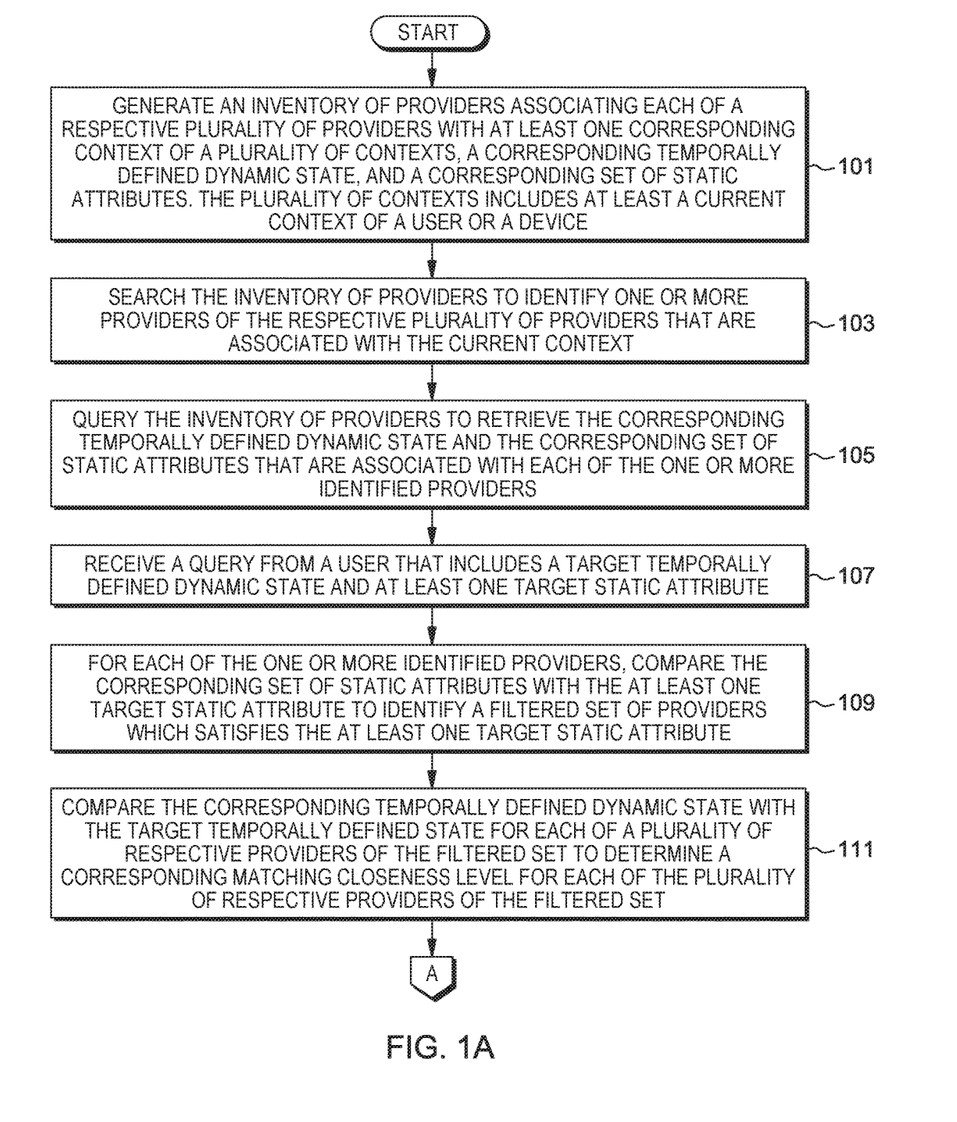
FIGS. 1A and 1B together comprise a flowchart illustrating an exemplary method for performing a search to locate a set of candidate providers within a current context of a user or a device.
Figure 1B:
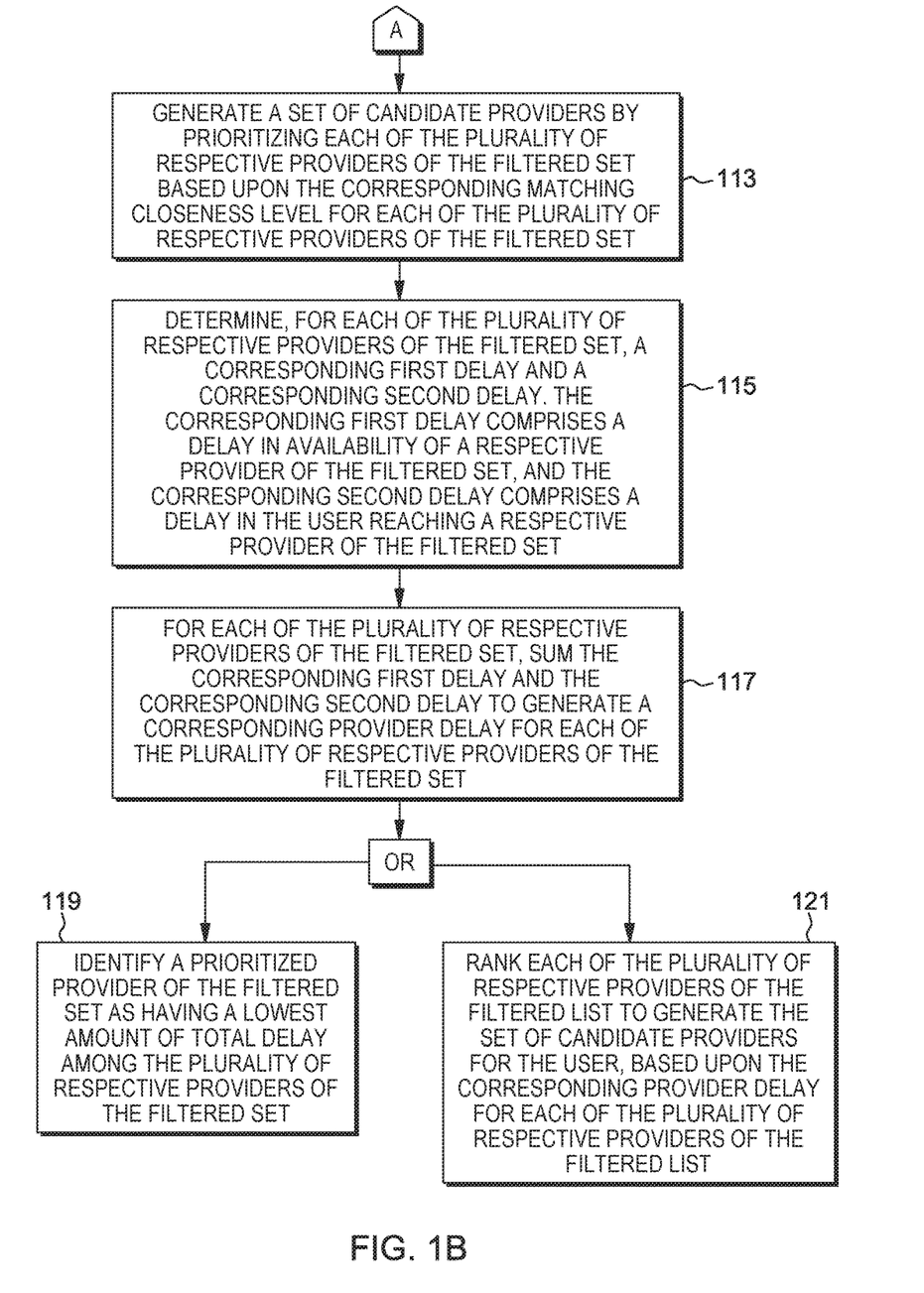

FIGS. 1A and 1B together comprise a flowchart illustrating an exemplary method for performing a search to locate a set of candidate providers within a current context of a user or a device. The procedure commences at block 101 where an inventory of providers is generated that associates each of a respective plurality of providers with at least one corresponding context of a plurality of contexts, a corresponding temporally defined dynamic state, and a corresponding set of static attributes. As used herein, the term "provider" may refer to a service provider, a provider of goods, a resource, or any of various combinations thereof. The plurality of contexts may comprise one or more spatially defined contexts, one or more temporally defined contexts, or any of various combinations thereof. For example, an illustrative context may be defined in terms of a geographic region, such as within a 25-mile radius of downtown Chicago, or within a set of time windows, such as Monday through Friday from 9 AM to 5 PM, or using a combination of geographic and temporal parameters.

The plurality of contexts includes at least the current context. The current context is defined as a present context for the user, a present context for the device, or a present context for both the user and the device. Context refers to a set of interrelated circumstances that form a setting for an event, a statement, or an idea, such that the event, statement, or idea can be understood, evaluated, and assessed based upon the setting. An illustrative example of a context is a current geographic location or a current address for a user or a device used by the user. Pursuant to this example, information about the current context of the user or the device can be obtained from a location detection mechanism such as a global positioning system (GPS) or a motion detector. Alternatively or additionally, the current context can be obtained from one or more applications that are currently being executed by a user. Information about the current context of the user or the device may also be obtained using temporal detectors, personal information management software, visual monitors, audio detectors, and sensors that provide an indication as to a specific activity taking place. For example, the temporal detector may keep track of time of day, date, and special periods of time such as holidays. Personal information management software may include the user's calendar or the user's email program. Visual monitors may be configured for detecting the user's mood, other people, nearby landmarks, nearby roads, and nearby buildings. Audio detectors may use a microphone in conjunction with voice recognition software to identify any signs of stress in the user's voice, any sense of urgency, a presence or absence of background noises, and information that identifies a particular location or activity such as an office environment, within a car, or walking.

The operational sequence progresses to block 103 (FIG. 1A) where the inventory of providers is searched to identify one or more providers of the respective plurality of providers that are associated with the current context. Next, at block 105, the inventory of providers is queried to retrieve the corresponding temporally defined dynamic state and the corresponding set of static attributes that are associated with each of the one or more identified providers. At block 107, a target temporally defined dynamic state and at least one target static attribute are received from the user. Then, for each of the one or more identified providers, the corresponding set of static attributes is compared with the at least one target static attribute to identify a filtered set of providers which satisfy the at least one target static attribute (block 109).

The corresponding temporally defined dynamic state is compared with the target temporally defined state for each of a plurality of respective providers of the filtered set at block 111 to determine a corresponding matching closeness level for each of the plurality of respective providers of the filtered set. The procedure then progresses to block 113 of FIG. 1B where a set of candidate providers is generated by prioritizing each of the plurality of respective providers of the filtered set based upon the corresponding matching closeness level for each of the plurality of respective providers of the filtered set.

For purposes of illustration, the prioritization is performed at block 115 by determining, for each of the plurality of respective providers in the filtered set, a corresponding first delay and a corresponding second delay. The corresponding first delay comprises a delay in availability of a respective provider of the filtered set, and the corresponding second delay comprises a delay in a user reaching a respective provider of the filtered set. The corresponding first delay and the corresponding second delay for each of the plurality of respective providers of the filtered set is summed to generate a corresponding provider delay for each of the plurality of respective providers of the filtered set (block 117). A prioritized provider of the filtered set is identified as having a lowest amount of provider delay among the plurality of respective providers of the filtered set (block 119). Alternatively or additionally, each of the plurality of respective providers of the filtered set is ranked to generate the set of candidate providers for the user, based upon the corresponding provider delay for each of the plurality of respective providers of the filtered list (block 121).

The procedure of FIGS. 1A and 1B may be applied to an illustrative scenario as follows. Assume that a traveler is in an unfamiliar city with a child who suddenly becomes ill. The traveler would like to find a pediatrician who accepts the traveler's insurance and who will be able to see the child as soon as possible. An inventory of providers is generated at block 101 (FIG. 1A) by receiving information that has been published on a publicly accessible forum such as the Internet. The information includes identifying indicia for each of a plurality of physicians, such as first name and last name, where each identifying indicia is associated with a context, a set of static attributes and a set of dynamic attributes. Examples of static attributes include a field of specialization, a date of licensing, a list of acceptable insurance carriers, and a highest academic degree. The set of dynamic attributes includes a current wait time, or a calendar indicating appointment availability. The context includes an address or a location for the physician.

The search of block 103 is formulated as a list of conditions on static attributes that must be satisfied. A bound on a desired time for services rendered by the provider is specified. For example, the bound could specify an earliest possible appointment, an immediate appointment, or an appointment within 24 hours. The search also considers the context in the form of the address or location. Optionally, a context in the form of a mobility attribute may be considered that specifies whether or not the user who seeks the provider's services has access to a car, versus using public transportation or walking.

The search may then be executed as follows. The current context of the user is identified as an address or a location where the user is presently situated (FIG. 1A, block 103). Based upon the mobility attribute of the user and the bound on the desired time of services, a maximum feasible distance between the provider and the user's address or location is determined. All providers that are within the maximum feasible distance and the location of the search are selected at block 103. At block 105, a set of static attributes and a set of temporally defined dynamic states are retrieved for each of the providers that were selected at block 103. One or more desired static attributes and a desired temporally defined dynamic state are received from the user at block 107. The providers that were selected at block 103 are then filtered at block 109 to determine whether or not all conditions on the static attributes specified by the user are satisfied. The providers that satisfy all conditions on the static attributes are placed on a filtered list.

For each provider on the filtered list, blocks 111-117 (FIGS. 1A and 1B) may be performed by determining an earliest time of service. The earliest time of service is computed using (a) an amount of travel time that it takes for the user to travel to that provider based upon a distance between the user and the provider and the mobility attribute, plus (b) a waiting time at the provider when the user arrives at the provider. Alternatively or additionally, the earliest time of service is computed by determining (c) a time at which the provider is available next. A time of service is calculated as a maximum of {(c), (a+b), earliest time provider is available after time (a+b)}. The providers are prioritized or ordered according to an earliest time of service and displayed to the user for selection (block 121).

For purposes of illustration, the operational sequence of FIGS. 1A and 1B may be implemented, for example, in a global positioning system (GPS) unit. Pursuant to another set of embodiments, this operational sequence may be performed in conjunction with a local business search using an Internet search engine such as Yahoo™ or Google™. According to yet another set of embodiments, the procedure of FIGS. 1A and 1B is performed as a subscription-based service.

Figure 2:
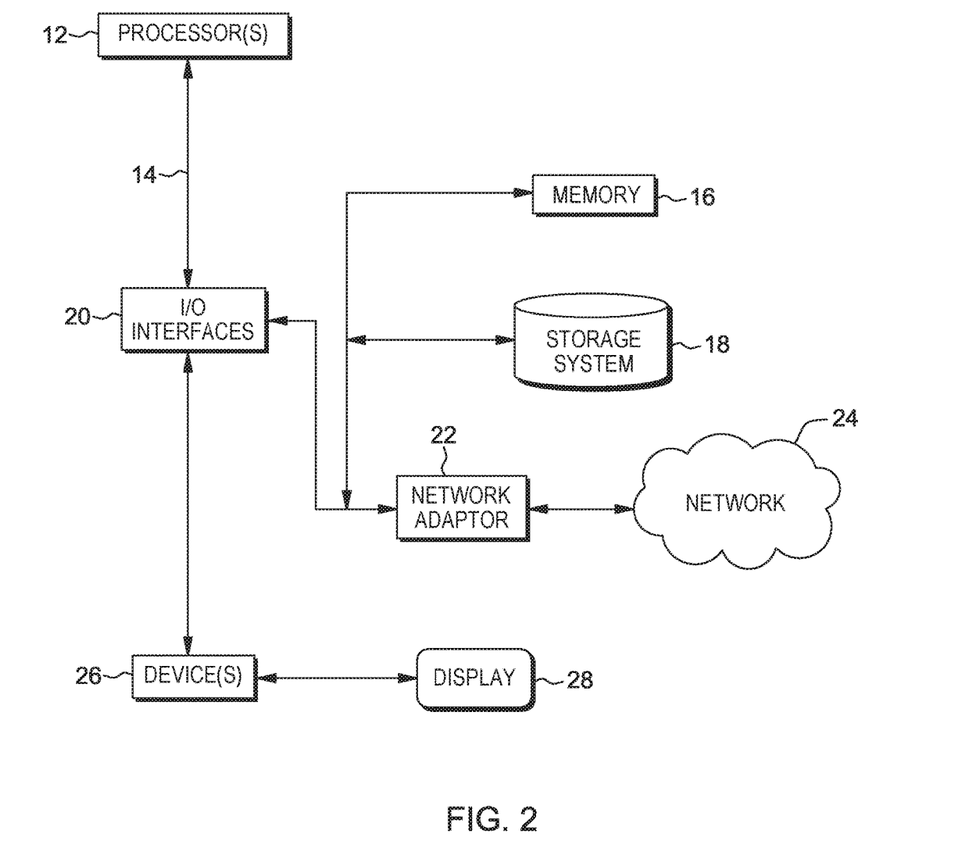
FIG. 2 is a hardware block diagram of an exemplary computer or processing system that may implement the method of FIGS. 1A and 1B, in one set of embodiments of the present disclosure.

FIG. 2 illustrates a schematic of an exemplary computer or processing system that may implement the method of FIGS. 1A and 1B, in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-executed method for performing a search to locate a set of candidate providers within a current context of a user or a device, the method comprising:

generating an inventory of providers associating each of a respective plurality of providers with a corresponding context of a plurality of contexts, a corresponding temporally defined dynamic state, and a corresponding set of static attributes; the plurality of contexts including at least the current context, said current context comprising a current geographic location of the user or a current geographic location of a device used by the user;

receiving, from said user, a mobility attribute indicative of a transportation mode available to the user for travelling to a location to receive a service from a provider;

receiving, from said user, a bound on a time of receiving said service from a provider;
searching the inventory of providers to identify one or more providers of the respective plurality of providers that are associated with the current context, said searching comprising: using said mobility attribute and bound on time of service to determine a maximum feasible distance within which a provider may be included in the set of candidate providers, and beyond which the provider will not be included in the set of candidate providers;
querying the identified one or more providers to retrieve the corresponding temporally defined dynamic state and the corresponding set of static attributes that are associated with each of the one or more identified providers;
receiving a query including a target temporally defined dynamic state and at least one target static attribute from the user;
for each of the one or more identified providers, comparing the corresponding set of static attributes with the at least one target static attribute to identify a filtered set of providers which satisfy the at least one target static attribute;
comparing the corresponding temporally defined dynamic state with the target temporally defined state for each of a plurality of respective providers of the filtered set to determine a corresponding matching closeness level for each of the plurality of respective providers of the filtered set; and
generating the set of candidate providers by prioritizing each of the plurality of respective providers of the filtered set based upon the corresponding matching closeness level for each of the plurality of respective providers of the filtered set.

2. An apparatus for performing a search to locate a set of candidate providers within a current context of a user or a device, the apparatus comprising a processor and a non-transitory computer-readable memory coupled to the processor, wherein the memory comprises instructions which, when executed by the processor, cause the processor to:
generate an inventory of providers associating each of a respective plurality of providers with a corresponding context of a plurality of contexts, a corresponding temporally defined dynamic state, and a corresponding set of static attributes; the plurality of contexts including at least the current context, said current context comprising a current geographic location of the user or a current geographic location of a device used by the user;
receive, from said user, a mobility attribute indicative of a transportation mode available to the user for travelling to a location to receive a service from a provider;
receive, from said user, a bound on a time of receiving said service from a provider;
search the inventory of providers to identify one or more providers of the respective plurality of providers that are associated with the current context, wherein to search, said processor is configured to: use said mobility attribute and bound on time of service to determine a maximum feasible distance within which a provider may be included in the set of candidate providers, and beyond which the provider will not be included in the set of candidate providers;
query the identified one or more providers to retrieve the corresponding temporally defined dynamic state and the corresponding set of static attributes that are associated with each of the one or more identified providers;
receive a query comprising a target temporally defined dynamic state and at least one target static attribute from the user;
for each of the one or more identified providers, compare the corresponding set of static attributes with the at least one target static attribute to identify a filtered set of providers which satisfy the at least one target static attribute;
compare the corresponding temporally defined dynamic state with the target temporally defined state for each of a plurality of respective providers of the filtered set to determine a corresponding matching closeness level for each of the plurality of respective providers of the filtered set; and
generate the set of candidate providers by prioritizing each of the plurality of respective providers of the filtered set based upon the corresponding matching closeness level for each of the plurality of respective providers of the filtered set.

3. A computer program product for performing a search to locate a set of candidate providers within a current context of a user or a device, the computer program product comprising a computer-readable storage medium having a computer-readable analysis program stored therein, wherein the computer-readable analysis program, when executed on a computer system comprising at least one processor, causes the processor to:
generate an inventory of providers associating each of a respective plurality of providers with a corresponding context of a plurality of contexts, a corresponding temporally defined dynamic state, and a corresponding set of static attributes; the plurality of contexts including at least the current context, said current context comprising a current geographic location of the user or a current geographic location of a device used by the user;
receive, from said user, a mobility attribute indicative of a transportation mode available to the user for travelling to a location to receive a service from a provider;
receive, from said user, a bound on a time of receiving said service from a provider;
search the inventory of providers to identify one or more providers of the respective plurality of providers that are associated with the current context, wherein to search, said processor uses said mobility attribute and bound on time of service to determine a maximum feasible distance within which a provider may be included in the set of candidate providers, and beyond which the provider will not be included in the set of candidate providers;
query the identified one or more providers to retrieve the corresponding temporally defined dynamic state and the corresponding set of static attributes that are associated with each of the one or more identified providers;
receive a query comprising a target temporally defined dynamic state and at least one target static attribute from the user;
for each of the one or more identified providers, compare the corresponding set of static attributes with the at least one target static attribute to identify a filtered set of providers which satisfy the at least one target static attribute;

compare the corresponding temporally defined dynamic state with the target temporally defined state for each of a plurality of respective providers of the filtered set to determine a corresponding matching closeness level for each of the plurality of respective providers of the filtered set; and generate the set of candidate providers by prioritizing each of the plurality of respective providers of the filtered set based upon the corresponding matching closeness level for each of the plurality of respective providers of the filtered set.

4. The method of claim 1 further comprising obtaining the current context as a current address of the user, or as a current address of a device used by the user.

5. The method of claim 1 further comprising performing the prioritization by determining, for each of the plurality of respective providers in the filtered set, a corresponding first delay and a corresponding second delay, wherein the corresponding first delay comprises a delay in availability of a respective provider of the filtered set, and the corresponding second delay comprises a delay in a user for travelling to and reaching the location of a respective provider of the filtered set.

6. The method of claim 1 further comprising identifying a prioritized provider of the filtered set as having a lowest amount of provider delay among the plurality of respective providers of the filtered set.

7. The apparatus of claim 2 further configured for obtaining the current context as a current address of the user, or as a current address of a device used by the user.

8. The apparatus of claim 2 further configured for performing the prioritization by determining, for each of the plurality of respective providers in the filtered set, a corresponding first delay and a corresponding second delay, wherein the corresponding first delay comprises a delay in availability of a respective provider of the filtered set, and the corresponding second delay comprises a delay in a user travelling to and reaching the location of a respective provider of the filtered set.

9. The apparatus of claim 2 further configured for identifying a prioritized provider of the filtered set as having a lowest amount of provider delay among the plurality of respective providers of the filtered set.

10. The computer program product of claim 3 further configured for obtaining the current context as a current address of the user, or as a current address of a device used by the user.

11. The computer program product of claim 3 further configured for performing the prioritization by determining, for each of the plurality of respective providers in the filtered set, a corresponding first delay and a corresponding second delay, wherein the corresponding first delay comprises a delay in availability of a respective provider of the filtered set, and the corresponding second delay comprises a delay in a user travelling to and reaching the location of a respective provider of the filtered set.

12. The method of claim 4 wherein the transportation mode comprises one or more of a personal vehicle, a bus, a train, a bicycle, a motorcycle, or walking.

13. The method of claim 5 further comprising summing the corresponding first delay and the corresponding second delay for each of the plurality of respective providers of the filtered set to generate a corresponding provider delay for each of the plurality of respective providers of the filtered set.

14. The apparatus of claim 7 wherein the transportation mode comprises one or more of a personal vehicle, a bus, a train, a bicycle, a motorcycle, or walking.

15. The apparatus of claim 8 further configured for summing the corresponding first delay and the corresponding second delay for each of the plurality of respective providers of the filtered set to generate a corresponding provider delay for each of the plurality of respective providers of the filtered set.

16. The computer program product of claim 10 wherein the transportation mode comprises one or more of a personal vehicle, a bus, a train, a bicycle, a motorcycle, or walking.

17. The method of claim 13 further comprising using the corresponding provider delay for each of the plurality of respective providers of the filtered set to determine an earliest time of service for each of the plurality of respective providers of the filtered set.

18. The apparatus of claim 15 further configured for using the corresponding provider delay for each of the plurality of respective providers of the filtered set to determine an earliest time of service for each of the plurality of respective providers of the filtered set.

* * * * *